(12) United States Patent
Soffer

(10) Patent No.: US 11,481,521 B2
(45) Date of Patent: Oct. 25, 2022

(54) SECURE RED-BLACK AIR-GAPPED PORTABLE COMPUTER

(71) Applicant: High Sec Labs Ltd., Caesarea (IL)

(72) Inventor: Aviv Soffer, Geva Carmel (IL)

(73) Assignee: High Sec Labs Ltd., Caesarea (IL)

(*) Notice: Subject to any disclaimer, the term of this patent is extended or adjusted under 35 U.S.C. 154(b) by 253 days.

(21) Appl. No.: 16/762,995

(22) PCT Filed: Nov. 12, 2018

(86) PCT No.: PCT/IL2018/051220
§ 371 (c)(1),
(2) Date: May 11, 2020

(87) PCT Pub. No.: WO2019/092729
PCT Pub. Date: May 16, 2019

(65) Prior Publication Data
US 2020/0285778 A1    Sep. 10, 2020

Related U.S. Application Data

(60) Provisional application No. 62/584,954, filed on Nov. 13, 2017.

(51) Int. Cl.
*G06F 21/74* (2013.01)
*G06F 1/16* (2006.01)
(Continued)

(52) U.S. Cl.
CPC ............ *G06F 21/74* (2013.01); *G06F 1/1639* (2013.01); *G06F 1/1692* (2013.01); *G06F 1/182* (2013.01);
(Continued)

(58) Field of Classification Search
CPC ........ G06F 21/32; G06F 21/34; G06F 21/602; G06F 21/604; G06F 21/71; G06F 21/74;
(Continued)

(56) References Cited

U.S. PATENT DOCUMENTS

2009/0106563 A1* 4/2009 Cherpantier ............ G06F 21/86
726/34
2014/0289433 A1    9/2014 Soffer et al.
(Continued)

FOREIGN PATENT DOCUMENTS

CN    103853987         6/2014
CN    103853987 A  *  6/2014 ............. G06F 21/74

OTHER PUBLICATIONS

International Search Report of PCT application No. PCT/IL2018/051220 dated Jan. 24, 2019.

*Primary Examiner* — Kevin Bechtel
(74) *Attorney, Agent, or Firm* — Bowdy and Neimark, PLLC

(57) ABSTRACT

A portable computer providing high level of security comprises of two completely logically and electrically isolated computer modules within one tamper resistant enclosure. One computer module is for Higher-Security applications (refer higher-security to as "red") and the other is for Lower-Security applications such as email and internet (refer lower-security to as "black"). The two modules are coupled together to secure Peripheral Sharing Switch that enables intuitive user interaction while minimizing the security risk resulted from sharing same peripheral device.

24 Claims, 6 Drawing Sheets

(51) Int. Cl.
    *G06F 1/18* (2006.01)
    *G06F 13/40* (2006.01)
    *G06F 13/42* (2006.01)
    *G06F 21/32* (2013.01)
    *G06F 21/34* (2013.01)
    *G06F 21/60* (2013.01)
    *G06F 21/86* (2013.01)
    *H04W 12/03* (2021.01)

(52) U.S. Cl.
    CPC ...... *G06F 13/4022* (2013.01); *G06F 13/4282* (2013.01); *G06F 21/32* (2013.01); *G06F 21/34* (2013.01); *G06F 21/602* (2013.01); *G06F 21/606* (2013.01); *G06F 21/86* (2013.01); *H04W 12/03* (2021.01); *G06F 2213/0042* (2013.01); *G06F 2221/2113* (2013.01); *G06F 2221/2143* (2013.01)

(58) Field of Classification Search
    CPC ......... G06F 21/82–85; G06F 21/86–87; G06F 2221/2113; G06F 2221/2143
    See application file for complete search history.

(56) References Cited

U.S. PATENT DOCUMENTS

| | | | |
|---|---|---|---|
| 2016/0026790 A1* | 1/2016 | Cohn | G06F 11/20 726/30 |
| 2016/0196454 A1* | 7/2016 | Soffer | H01R 13/7175 726/16 |
| 2016/0203343 A1 | 7/2016 | Soffer | |
| 2019/0114425 A1* | 4/2019 | Surdu | G06F 21/57 |

* cited by examiner

Device White-list

| # | Class ID | Sub-class | Protocol | VID | PID | S/N | Map to | Dir |
|---|---|---|---|---|---|---|---|---|
| 1 | 0Bh – Smart-card | 01h | 01h | 054e | 0752 | * | + + + + | N N R W |
| 2 | | | | | | | | |
| 3 | | | | | | | | |

Device Black-list

| # | Class ID | Sub-class | Protocol | VID | PID | S/N | Map to | Dir |
|---|---|---|---|---|---|---|---|---|
| 1 | 08h – Mass storage | 02h | 02h | 051e | 0750 | * | | N N N N |
| 2 | | | | | | | | |
| 3 | | | | | | | | |

Device Read

| # | Class ID | Sub-class | Protocol | VID | PID | S/N | Map to | Dir |
|---|---|---|---|---|---|---|---|---|
| 1 | | | | | | | | |
| 2 | | | | | | | | |
| 3 | | | | | | | | |

Figure 4

SECURE RED-BLACK AIR-GAPPED PORTABLE COMPUTER

CROSS-REFERENCE TO RELATED APPLICATIONS

This application is a National Phase Application of PCT International Application No. PCT/IL2018/051220, International Filing Date Nov. 12, 2018, entitled "Secure Red-Black Air-Gapped Portable Computer", published on May 16, 2019 as International Patent Application Publication No. WO 2019/092729, claiming the benefit of U.S. Provisional Patent Application No. 62/584,954, filed Nov. 13, 2017, which is incorporated herein by reference in its entirety.

FIELD OF THE INVENTION

The present invention relates to a portable computer platform that provides higher level of security compared to prior-art computers. More specifically the present invention relates to a portable computer that comprises of two highly isolated (Air-Gapped) computer modules, each with a different security level.

BACKGROUND OF THE INVENTION

Portable computers are everywhere today. From smart phones to personal computers, organizations are using these platforms for critical security applications. In the course of the work, the user may need to communicate with a network or databases having lower security level without compromising the security of the high-security data.

Secure KVM Device Ensuring Isolation of Host Computers

U.S. Pat. No. 8,769,172, titled "Secure KVM device ensuring isolation of host computers", to Soffer, discloses a Keyboard Video Mouse (KVM) apparatuses and systems for operating multiple computers from a single console using a secured KVM device, while preventing information leakage between the computers. The system comprises several hosts connected through a secured KVM device to keyboard and mouse and one or more user displays. Secured KVM enables standard bi-directional communication between Secured KVM and user keyboard and mouse and between hosts peripheral ports and Secured KVM. Secured KVM physically enforces unidirectional data flow from attached keyboard and mouse to attached hosts peripheral ports to avoid potential leakages between hosts.

Encryption/decryption modules are commercially available, For example, Raytheon Proteus Cryptographic Module (PCM) is described in www.raytheon.com/capabilities/rtnwcm/groups/corporate/documents/image/pcm_proteus.pdf U.S. Pat. No. 9,697,837; titled "Secured audio channel for voice communication"; to Yaron Hefetz; discloses security devices and methods for hindering data theft and data leaks via audio channel of a computer system. The device and method are based on passing the audio signals through a coding vocoder that receives input audio signal from a computer and compressing the signal to a low bit-rate digital data indicative of human speech; and a decoding vocoder that decompress the digital data back to a secure audio signal. The data transfer of the protected audio channel is intentionally limited not to exceed the bit-rate needed to carry vocoder-compressed human speech which is well below the capabilities of unprotected audio channel. Both analog and digital audio ports may be protected. Hardware bit-rate limiter protect the system from software hacking.

Website www.en.wikipedia.org/wiki/Hardware_restriction discusses hardware security measures such as trusted boot.

Some background information may be found in the following referenced patents and applications:

Patent U.S. Pat. No. 6,578,089—Multi-computer access secure switching system;

Patent U.S. Pat. No. 8,646,108—Multi-domain secure computer system;

Patent U.S. Pat. No. 8,892,627—Computers or microchips with a primary internal hardware firewall and with multiple internal hardware compartments protected by multiple secondary interior hardware firewalls;

Patent US20090037996—Multi-Domain Secure Computer System.

SUMMARY OF THE INVENTION

The present invention relates to a portable computer platform that provides higher level of security compared to prior-art computers. More specifically the present invention relates to a portable computer that comprises of two completely isolated (the term "Air-Gapped) computer modules. The term "Air-Gapped" is used in the industry to indicate that there is a physical barrier between two sub-units (in contrast to software based logical separation which is vulnerable to hacking). One computer module for Higher-Security applications (referred to as "red"); and the other (referred to as black) for Lower-security applications such as email and Internet. The two modules are coupled together to secure Peripheral Sharing Switch (PSS) or Peripheral Sharing Device (PSD) that enables intuitive user interaction while minimizing the security risk resulted from sharing same peripheral devices. Note that Air-Gap is a network security measure employed on one or more computers to ensure that a secure computer network is physically isolated from the unsecured networks, such as the public Internet or an unsecured local area network.

In an exemplary embodiment, secure portable computer device is provided, the secure portable computer device comprises: a higher-security computer module, for performing higher-security operations; a lower-security computer module, for performing low security operations; a secure KVM (Keyboard Video Mouse) switch, interfacing said higher-security computer module and said lower-security computer module to a keyboard, a pointing device and a display, while preventing data flow from the higher-security computer module to the lower-security computer module; and an enclosure, for enclosing at least the higher-security computer module, the lower-security computer module, and the secure KVM, wherein the enclosure is sized to be used as a portable computer to be carried by a user.

In some embodiments the higher-security computer module is connected to a higher-security network, and the lower-security computer module is connected to a lower-security network.

In some embodiments the lower-security network is the Internet.

In some embodiments the secure KVM further preventing data flow from the lower-security computer module to the higher-security computer module.

In some embodiments the only the lower-security computer module comprises a wireless communication device.

In some embodiments the at least one wireless communication device is selected from the group consisting of a cellular modem, Wireless LAN modem, WiFi modem and Bluetooth modem.

In some embodiments the higher-security computer module further comprises:

a higher-security filter; and at least one higher-security USB jack, wherein the higher-security filter is for: allowing authorized USB devices to communicate with the higher-security computer module via the higher-security USB jack, and preventing unauthorized USB devices from communicating with the higher-security computer module via the higher-security USB jack.

In some embodiments the higher-security filter qualifies or disqualifies a USB connected to the higher-security USB jack based on a table of higher-security device qualification parameters.

In some embodiments the lower-security computer module further comprises: a lower-security filter; and at least one lower-security USB jack, wherein the lower security filter is for: allowing authorized USB devices to communicate with the lower-security computer module via the lower-security USB jack, and preventing unauthorized USB devices from communicating with the lower-security computer module via the lower-security USB jack, wherein the lower-security filter qualifies or disqualifies a USB connected to the lower-security USB jack based on a table of lower-security device qualification parameters, and wherein the table of lower-security device qualification parameters is different than the table of higher-security device qualification parameters.

In some embodiments the secure KVM switch further comprises a video processor providing a composite video signal derived from signals from both the lower-security computer module and the higher-security computer module.

In some embodiments the secure KVM switch further comprises system controller for performing at least one of: mouse tracking; and control keyboard signal identification, and using the results of the at least one of the mouse tracking and control keyboard signal identification for controlling the video processor for performing at least one of: selecting active window, creating a window, closing a window, sizing a window, and moving windows on a display.

In some embodiments the portable computer device further comprises a user authentication device.

In some embodiments the user authentication device is selected from a group consisting of a biometric sensor and smart card.

In some embodiments the secure portable computer device further comprises: a flat screen display, and at least one of touch-screen or touch-pad to be used as a pointing device.

In some embodiments the lower-security computer module is configured to be coupled to an external display or projector through video output connector.

In some embodiments the isolation in the power supply charger is for preventing data leakages through power signaling between the higher-security computer module and the lower-security computer module.

In some embodiments the higher-security computer module is running a higher-security operating system; and the lower-security computer module running a lower-security operating system.

In some embodiments the enclosure is tamper resistant.

In some embodiments the enclosure is subdivided to compartments for separately enclosing at least each one of: the higher-security computer module, the lower-security computer module, and the secure KVM switch.

In some embodiments the compartments for separately enclosing the higher-security computer module, and the secure KVM switch are made of metal.

In some embodiments the enclosure further comprises at least one tampering sensor, wherein, on detection of tampering attempt at least one of the following actions is performed: permanently disabling of at least the higher-security computer module, and permanently erasing data in mass storage associated with the higher-security computer module.

In some embodiments the tampering sensor is selected from a group consisting of: mechanical tampering switch; accelerometer; light sensor; micro-mesh covering the whole module PCB; and an X-Ray sensor.

In some embodiments the secure portable computer device further comprises at least one of: audio output such as a speaker or audio output interface; and audio signals at least from said higher-security computer module is routed to said audio output via at least one of: audio out data diode; or a back-to-back coding vocoder-decoding vocoder.

In some embodiments the secure portable computer device further comprises crypto module connected to said higher-security computer module and to said lower-security computer module, wherein said crypto module is for allowing data such as files, messages, voice and video to be sent and received in encrypted format over said at least one wireless communication device in said lower-security computer module.

In some embodiments the d crypto module support functions such as log, anti-tampering, and secret key storage.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments of the present invention only, and are presented in the cause of providing what is believed to be the most useful and readily understood description of the principles and conceptual aspects of embodiments of the invention. In this regard, no attempt is made to show structural details in more detail than is necessary for a fundamental understanding of the embodiments; the description taken with the drawings making apparent to those skilled in the art how the several forms of the invention may be embodied in practice. In the accompanying drawings:

FIG. 4 schematically illustrates screens of the programming software used for configuring of USB filters within a secure air-gapped portable computer system according to an exemplary embodiment of the current invention.

DETAILED DESCRIPTION OF THE DRAWINGS

Figure 1:
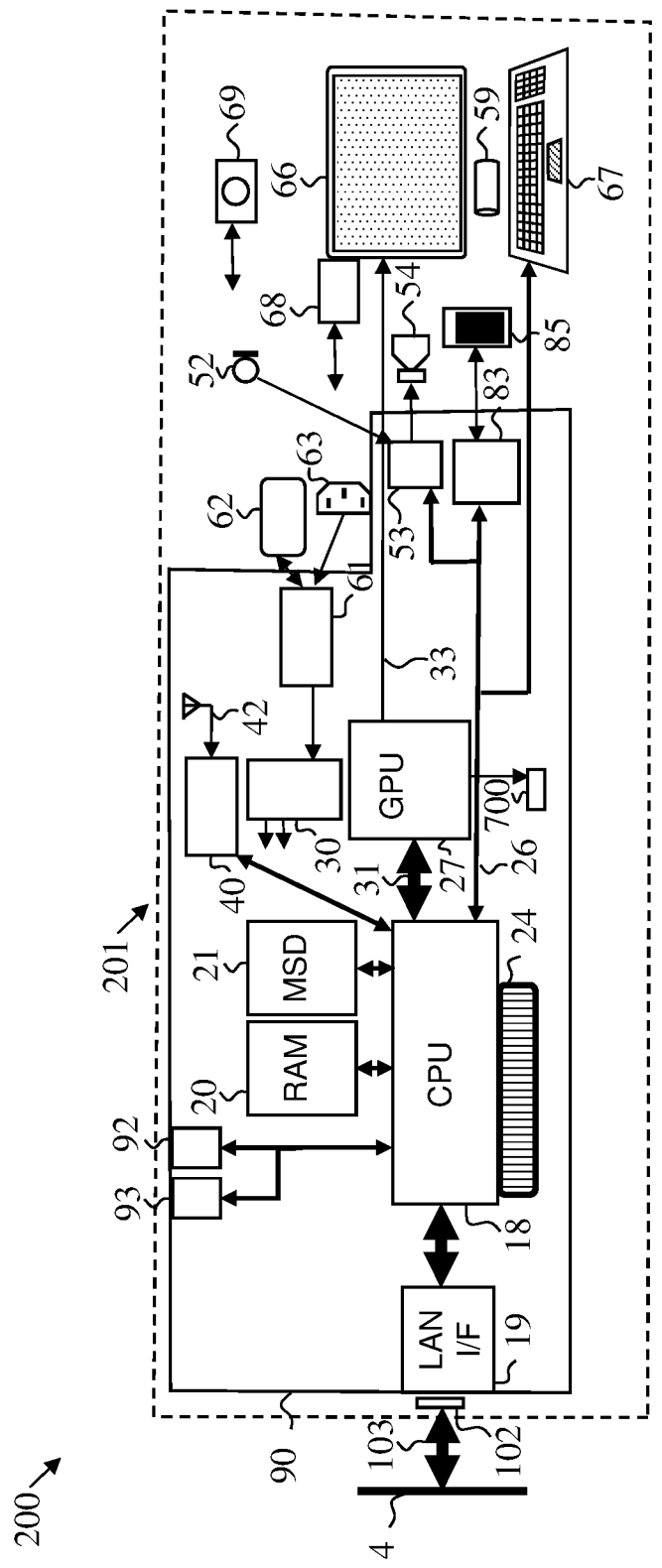
FIG. 1 schematically illustrates a portable computer system according to the prior-art.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

FIG. 1 schematically illustrates a portable computer system 200 according to the prior-art.

In this figure the portable computer 200 is enclosed in compact self-contained plastic or metal enclosure 201. Display module 66 is typically a small LCD (Liquid Crystal Display) panel with LED (Light Emitting Diode) or CCFL (Cold Cathode Fluorescent Lamp) backlight. It is typically connected to the main enclosure part using flexible joints or hinges 59 to enable display folding on the keyboard/pointing device 67. The keyboard/pointing device 67 has a part made of alphanumeric keys and an optional pointing device such as GlidePoint™ (Alps trademark) or other pointing device technology. In some prior-art portable computer the display 66 is further equipped with touch-screen or multi-touch function 68 that digitizes the user finger locations on the display 66. In some prior-art portable computers the optional keyboard/pointing device 67 is omitted and replaced by soft-keyboard displayed on display 66 and captured by touch-screen controller 68. In some embodiment of prior-art portable computer, the device 200 is further equipped with one or more video cameras 69 to enable the user to take video or movies and to support functions such as video conferencing and face recognition.

CPU (Central Processing Unit) 18 is a single-core or multiple-core processor or SOC (System On a Chip) that runs the operating system and user applications. CPU 18 may be ARM, Intel, AMD or any other processing architecture. It is cooled by cooling device 24. Cooling device 24 may be simple heatsink, heatsink with fan, heat-pipe or any other heat dissipation technology that will cool the active parts such as CPU 18, Graphics Processing Unit (GPU) 27, Random Access Memory (RAM) 20 and other heat generating components. CPU 18 is coupled to LAN (Local Area Network) interface 19 that is further coupled through the LAN jack 102 and LAN cable 103 to the LAN 4 through Ethernet cable. CPU 18 is further coupled to the wireless LAN or cellular Modem interface 40 that is coupled to the wireless LAN antenna 42 to enable connection to nearby wireless networks. Commonly, Wi-Fi protocol is used for connecting to nearby wireless networks. Optionally, other wireless protocols, for example Bluetooth are supported.

CPU 18 is further coupled to RAM (Random Access Memory) volatile memory 20. This memory may be DDR (Dual Data Rate) 2, 3, 4 or any other suitable volatile memory technology. CPU 18 is further coupled to the Mass Storage Device (MSD) 21. MSD 21 is large capacity non-volatile memory that used to store the operating system, user application, user data and any other permanent data that is stored locally. MSD 21 may be electromechanical hard-drive, solid-state flash based, SSD (Solid State Disk) or any other non-volatile memory technology.

CPU 18 is further coupled to USB jacks 92 and 93 that enable the user to connect various standard USB devices such as USB mass-storage device or USB keyboard. Protocols other than USB are used by some manufacturers to connect peripheral devices.

CPU 18 is further coupled through internal or external bus such as PCI bus 31 to the GPU (Graphic Processing Unit) 27. Video output 33 generated by GPU 27 is coupled to display module 66.

Audio CODEC 53 is coupled to the CPU 18 through serial bus 26 such as USB or I2S. It plays digital sound through one or more speakers 54. Additionally, audio CODEC 53 is connected to microphone 52.

Optionally, portable computer system 200 further comprises a user authentication device 85 such a biometric sensor (for example fingerprint reader) or smart card reader 85 coupled to a smart-card reader or biometric reader arbiter 83.

AC power to charge the battery and to operate the system is connected through AC or DC cord to Power connector 63. Power connector 63 is coupled to the power supply and charger 61 that coverts the power input into low-voltage DC and adjust the charging current of the coupled battery 62. It should be noted that AC/DC power supply 61 may be external to the device 101. In such case, battery 62 is coupled to an internal switcher/charger module (not shown here). When AC power is not available, power supply and charger 61 is powering the whole system from battery 62 power.

Commonly, portable computer system 200 comprises a mother board 90 which is one or more interconnected Printed Circuit Board Assemblies (PCBAs).

Figure 2:
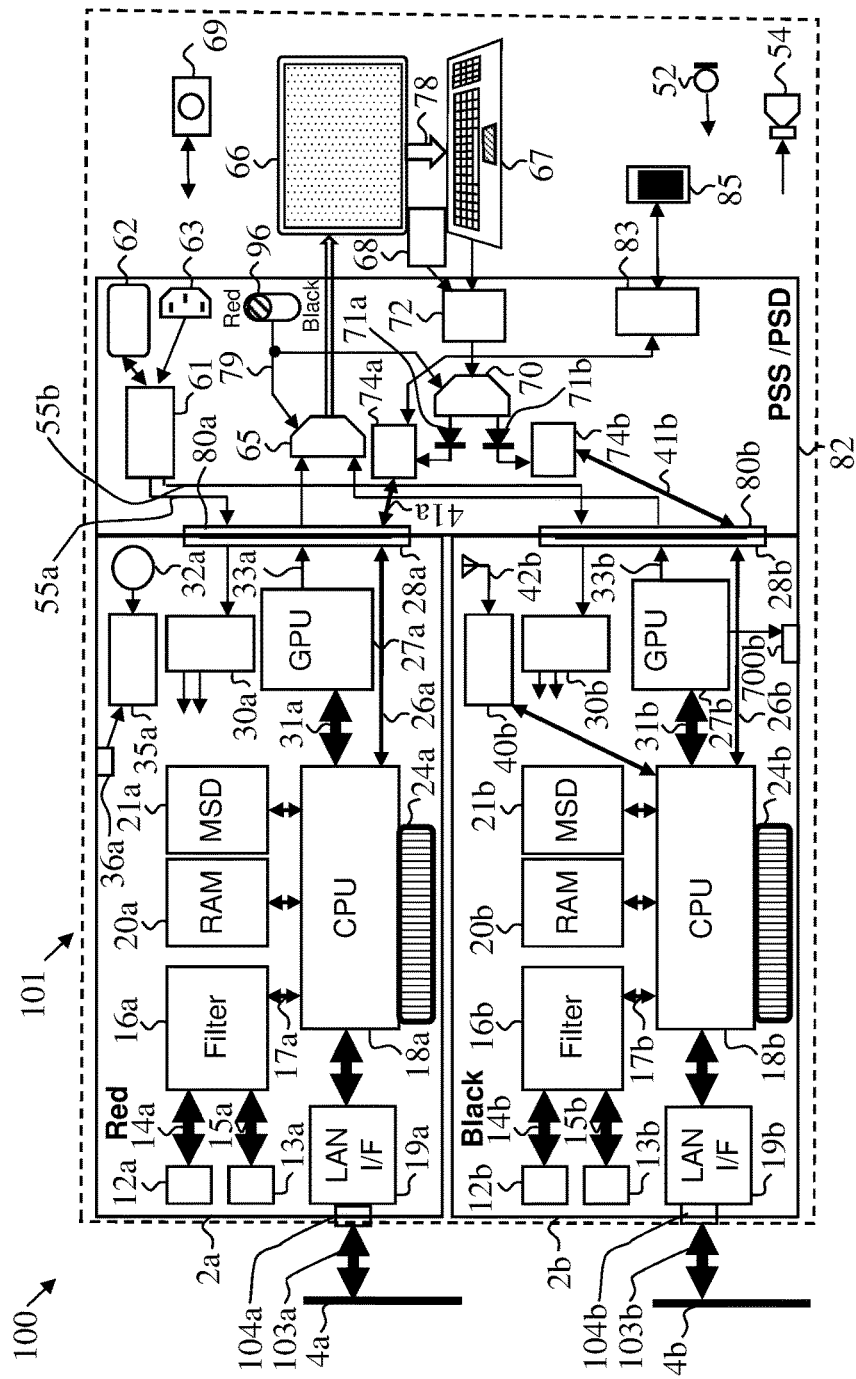
FIG. 2 schematically illustrates a secure air-gapped portable computer system according to an exemplary embodiment of the current invention.

FIG. 2 schematically illustrates a secure air-gapped portable computer system 100 according to an exemplary embodiment of the current invention.

In this figure the secure portable computer 100 is enclosed in compact self-contained plastic or metal enclosure 101.

In this embodiment of the current invention the device secure portable computer system 100 is divided into four different components or modules:

1. The Red (Higher-Security) computer module 2a that runs the higher security applications;
2. The Black (Lower-Security) computer module 2b that runs the lower-security applications;
3. Peripheral Sharing Switch (PSS) or Peripheral Sharing Device (PSD) module 82;
4. Shared Input/Output devices such as:
   Display module 66; Keyboard and pointing device module 67; Biometric user authentication sensor 85; Video camera 69; Microphone 52; and speaker 54

In the following figures and discussion, numeral followed by the letter "a" will refer to elements in or related the Red (Higher-Security) module 2a, while same numeral followed by the letter "b" will refer to elements in or related the Black (Lower-Security) module 2b. Numeral not followed by a letter will generally refer to elements common to or associated with both Red (Higher-security) and Black (Lower-Security) modules, or the corresponding elements belonging to the prior art This convention is to be understood even if not specifically reflected in the name of an element. It should be understood that the term "Lower-Security" does refer to absence of any kind of security. The Black (Lower-Security) module 2b may have protection means, but it lacks at least some of the security provided by the Red (Higher-Security) computer module 2a. The modules and components listed about are mechanically attached to create a single portable device 100 physically similar to prior-art laptop computer, tablet or smart-phone. It should be noted that enclosure 101 may be internally sub-divided to separate the different components. For example, separate components may be radiation shielded from each other.

The Red (Higher-Security) computer module 2a comprises of CPU (Central Processing Unit) 18a. CPU 18a may be x86, ARM, MIPS (Microprocessor without Interlocked Pipeline Stages), RISC (Reduced Instruction Set Computer) or any other single or multiple core microprocessor. For the clarity of the figure the north bridge and south bridge and other processor chipset components were all combined here as a single component 18a. CPU 18a is coupled to RAM (Random Access Memory) 20a. RAM 20a may be Cache, SRAM, DDR (Dual Data Rate) SDRAM, DDR2, DDR3, DDR4 or any other volatile memory technology. RAM 20a may be installed as one or more memory modules or as individual chips. CPU 18a is also coupled to Mass Storage Device (MSD) 21a. Mass Storage Device is non-volatile memory that is used to store the Red (Higher-security) computer 2a data and programs. It may use non-volatile memory technologies such as SSD (Solid State Disk) that uses flash, mechanical hard-drive or any other suitable non-volatile memory technology. Preferably the CPU 18a interface with the Mass Storage Device 21a should support full data encryption for added security. MSD 21a may be optionally coupled to CPU 18a through full-time hardware based disk encryption module of the prior-art (not shown here). Mass Storage Device 21a may be modular (removable) or preferably mechanically fixed for added security.

CPU 18a is further mechanically and thermally coupled to the Cooling device 24a. Cooling device may use cooling fans, heat-pipes, cooling fins, radiators or any other combination of methods to enable efficient cooling of the CPU 18a. CPU 18a power management and Cooling device 24a control is designed to operate continuously at the same noise level to prevent cyberattacks that abuses cooling system noise signature (called Fansmitting).

CPU 18a is further coupled to Higher-Security LAN (Local Access Network) interface 19b to enable wired connection to the high security LAN 4a using Higher-Security LAN cable 103a and Higher-Security LAN jack 104a. LAN interface 19a may comprise MAC (Media Access Controller), PHY (Physical Layer), LAN transformer for isolation and Higher-Security LAN jack 104a. Higher-Security LAN jack 104a is optionally configured to prevent crossed connection of low security LAN 4b cable 103b into the high security interface 19a. Higher-Security LAN jack 103a is optionally RJ-45 type with modified or keyed shape to prevent other standard plugs to fit it.

Alternatively, High security LAN jack 103a is clearly marked, positioned or colored to make it different from low security LAN jack 103b. For example, High security LAN jack 103a may have a cover (not seen in the figure) that needs to be removed or open in order to plug the High-Security LAN cable 103a. Optionally the opening the cover of High security LAN jack 103a has a lock that requires a key to open it.

CPU 18a is further optionally coupled to USB high security filter 16a through USB lines 17a. USB filter 16a is a combination of:

General Purpose Host Emulator configured to connect (enumerate) only allowed USB devices based on pre-programmed whitelist and blacklist.

Device emulators coupled to the General Purpose Host Emulator to repeat the same USB devices in front of the CPU 18a.

Alternatively, USB high security filter 16a may comprise:
    a pre-qualification microcontroller;
    a mode select switch connected to the serial communication peripheral device port and selectively connecting the serial communication peripheral device port to the selected one of:
    the pre-qualification microcontroller; and
    the first serial communication host connector; and
    a serial communication enumeration and reset detector, connected to the serial communication peripheral device port, to monitor the serial communication peripheral device port and casing the mode select switch to switch the serial communication peripheral device port to the pre-qualification microcontroller when the serial communication device is disconnected from the serial communication peripheral device port;
    wherein the pre-qualification microcontroller is capable of enumerating a connected peripheral device according to a table of peripheral device qualifications,
    and wherein the table of peripheral device qualifications may be field re-programmed.

US 20150365237; to Aviv Soffer; titled "USB security gateway", which is incorporated herein by reference, provides more details on possible embodiments for constructing and operating filters 16x.

US 20150020189; to Aviv Soffer; titled "Electro-mechanic USB locking device", which is incorporated herein by reference, provides details on possible embodiments for securely attaching a filter to an exposed USB jack.

Higher-Security USB Filter 16a host emulator is coupled through USB lines 14a and 15a to the General Purpose filtered High-Security USB jacks 12a and 13a respectively. CPU 18a other USB interface 26a is coupled to the Higher-Security Main Connector 28a of Red (Higher-Security) computer module 2a. Higher-Security Main connector 28a is used to provide all other peripheral device interfaces as well of power to the Red (Higher-Security) computer module 2a.

It should be noted that Main Connector 28x may be divided to few physical connectors such as a power connectors, a video connector, etc. In here, "x" following a numeral may stand for any of the letters a, b, etc. or the absence of a letter to point to identical or similar drawing elements.)

CPU 18a is further coupled through interface 31a to a Higher-Security Graphical Processing Unit (or GPU) 27a. This chip or chipset generates the Higher-Security graphic display video output 33a that is coupled through the Higher-Security Module Main Connector 28a, and through the PSS/PSD module 82, to the flat panel display 66 to provide user display. Higher-Security GPU 27a may use internal memory or may share the Higher-Security main RAM 20a with the Higher-Security CPU 18a. Display 66 is typically TFT (Thin Film Transistor) LCD (Liquid Crystal Display), however, other display technologies may be used. Display 66 is preferably or optionally having an optical film to allow visibility only from narrow angles perpendicular to the panel surface for added security.

The Red (Higher-Security) Computer module 2a comprises of Higher-Security power supply 30a that receives one or more low voltage inputs from the PSS/PSD module 82 and convert it into multiple low voltage planes that are required to power the CPU 18a, GPU 27a, RAM 20a and all other Computer module 2a power consumers. Power supply 30a is designed to filter (attenuate) digital noise from Red (Higher-Security) Computer module 2a, via the PSS/PSD module 82 to the Black (Low-security) Computer module 2b.

The Red (High-Security) Computer module 2a comprises of optional anti-tampering or self-destruction function 35a that is powered from the power supply 30a while device 100 is powered up, or by backup battery 32a while device 100 is unpowered. Tampering event is being detected by one or more Tampering sensors 36a. Tampering sensors 36a may comprise:
  Mechanical tampering switches;
  Accelerometers;
  Light sensors;
  Micro-mesh covering the whole module PCB; and
  X-Ray sensors.

Upon detection of tampering event through one or more Tampering sensors 36a, the anti-tampering or self-destruction function 35a will optionally cause a permanent damage to the Secure computer module 2a—for example—completely delete or even destroy the high security MSD 21a. The Red (High-Security) Computer module 2a is typically running secure Operating System such as Linux Kernel or Android other custom made images or operating systems. Computer module 2a may be further comprising of prior-art trusted-boot and trusted execution software (for example UEFI) or hardware (for example TPM).

Optionally, MSD 21a (and optionally also MSD 21b) is encrypted such that if removed, data within it cannot be recovered without the proper key. Such key may be deleted when tampering event was detected.

The Black (Lower-Security) Computer module 2b is similar to the Red (Higher-Security) Computer module 2a. Thus, some of the similar components will not be discussed herein.

For example, optional filter 16b may be physically similar or identical to 16a, but may be differently configured, and it is intended to protect the module from USB cyber attacks.

The CPU 18b of the Black (Lower-Security) Computer module 2b may run different Operating System (for example Microsoft Windows) and may have different performance specification.

The GPU 27b may be optionally coupled to external display or projector through video output connector 700b. GPU 27a preferably is not connected to an external display support as additional security measure.

Video output connector 700b may be VGA, DVI, HDMI, Micro HDMI, DisplayPort or any other standard video protocol.

Unlike the Red (Higher-Security) Computer module 2a, the Black (Higher-Security) Computer module 2b of the exemplary embodiment of the current invention may not have anti-tampering function.

Unlike the Red (Higher-Security) Computer module 2a, the Black (Higher-Security) Computer module 2b may be equipped with wireless LAN or cellular Modem function 40b that is coupled to antenna 42b. Wireless LAN function 40b may be IEEE 802.11G, Bluetooth, Cellular Modem, LTO or any other wireless voice and data modem.

Both computer modules 2a and 2b are mechanically and electrically coupled to the PSS/PSD module 82. Computer modules 2a and 2b may be separated from the PSS/PSD through fasteners such as thumb screws. This allows modularity and simpler maintenance and support. Such arrangement also enables easier upgrades in case that one or two computing modules should be upgraded.

The PSS/PSD module 82 comprises of Host Emulator and Controller function 72. This function emulates the host computer in front of the connected USB HID (Human Interface Device) peripheral devices—the keyboard, touchpad 67 and optional touch-screen that is coupled through link 78. The Host Emulator and Controller function 72 translate the keyboard, touchpad and touchscreen commands into serial unidirectional data stream that is switched by HID multiplexer 70 and data diodes 71a and 71b to HID device emulators 74a and 74b respectively. HID device emulators 74a and 74b translate the unidirectional data stream back into USB HID commands to interface through Module Main connectors 80a and 80b (which mate the Main module connectors 28a and 28b respectively).

Optionally, an external USB jack (or two jacks), not seen in these figures, filtered to accept only an external mouse (or a mouse and a keyboard) may be coupled to Host Emulator and Controller function 72 to augment or replace HID 67 and/or 68.

USB lines 41a and 41b are routed via Module Main connectors 80a and 80b which mate the Main module connectors 28a and 28b respectively to USB lines 26a and 26b and to CPU 18a and 18b in the routed computer module 2a and 2b respectively.

Red-Black switch 96 controls the PSS/PSD module 82 channel selection through selection line 79 and HID multiplexer 70 and video multiplexer 65. When the user wants to interact with the Red (Higher-Security) computer module 2a, Red-Black switch 96 is placed at the top position (red). This allow the two multiplexers to switch both HID (keyboard, mouse, touchpad and touchscreen) and video to the Red (High-Security) Computer module 2a. Similarly when the Red-Black switch is placed in the bottom position (Black), the two multiplexers switches both HID (keyboard, mouse, touchpad and touchscreen) and video to the Black (Low-security) Computer module 2b.

AC power to charge the battery and to operate the system is connected through AC or DC cord to Power connector 63. Power connector 63 is coupled to the power supply and charger 61 that coverts the power input into low-voltage DC and adjust the charging current of the coupled battery 62. It should be noted that AC/DC power supply 61 may be external to the device 101. In such case, battery 62 is coupled to an internal switcher/charger module (not shown here). When AC power is not available, power supply and charger 61 is powering the whole system from battery 62 power. Power supply and charger 61 powers two different highly-isolated output channels: 55a one powers the Red (Higher-Security) Computer module 2a and 55b powers the Black (Lower-Security) Computer module 2b through Main module connectors 80a and 80b, mating Main module connectors 28a and 28b and power supplies 30a and 30b respectively. Isolation in the power supply charger 61 is useful for security to prevent data leakages through power signaling between the two computer modules 2x.

PSS/PSD module 82 may be further comprising a Multi-Domain smart-card reader or preferably biometric (fingerprints) reader arbiter 83 that is coupled to a biometric sensor and/or card reader 85 at one side and to the two HID Device emulators 74a and 74b. The two HID Device emulators 74a and 74b are optionally configured also as a biometric reader device emulator to support the biometric sensor 85.

U.S. Pat. No. 9,286,460; to Aviv Soffer; titled "User authentication device having multiple isolated host interfaces", which is incorporated herein by reference, provides more details on possible embodiments for constructing and operating devices for enabling a user to use a single user authentication device such as smart-card reader, such that the user is capable of securely interfacing with two or more isolated computers and enabling the user to authenticate and remain authenticated at multiple computers at the same time.

Figure 3:
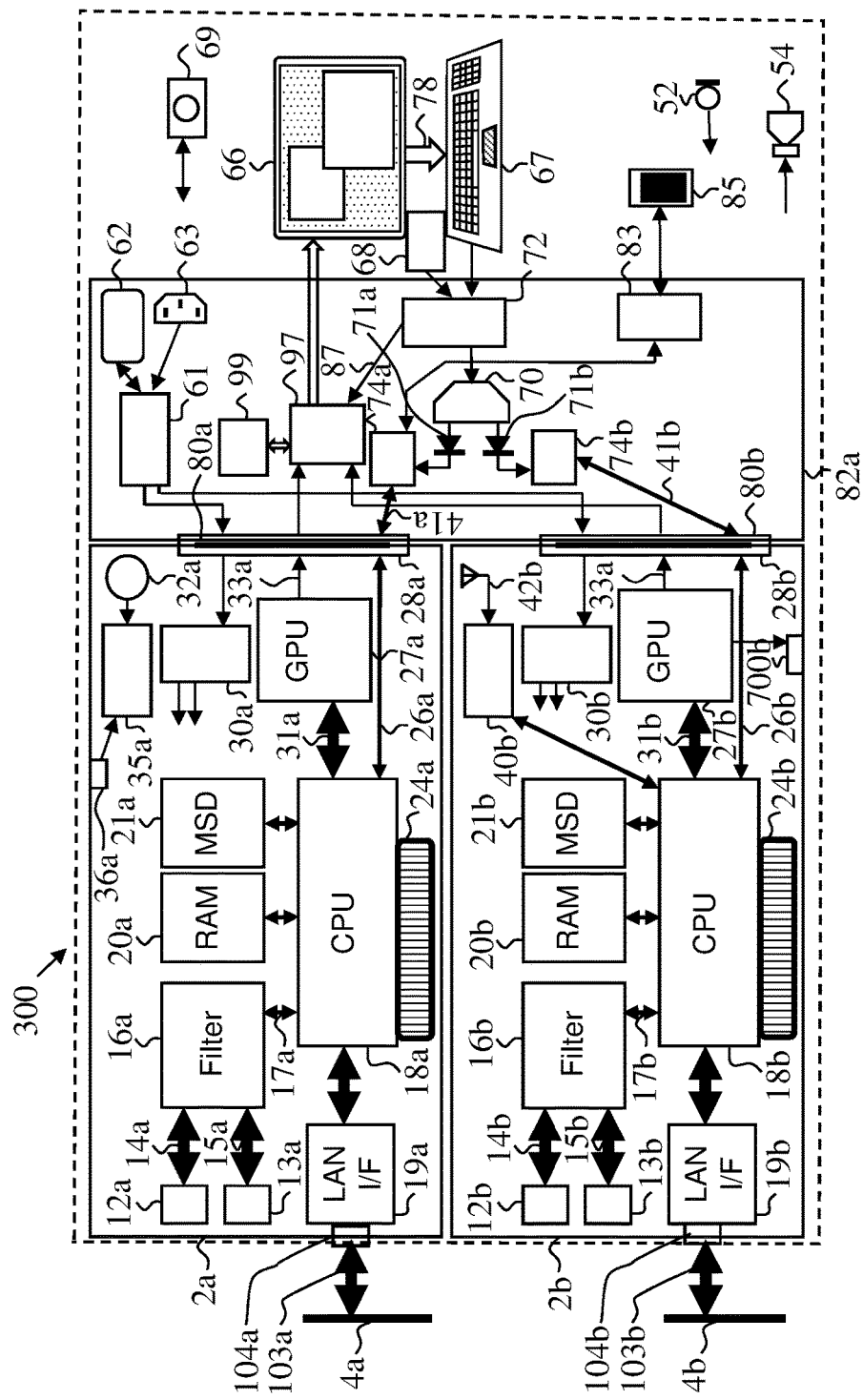
FIG. 3 schematically illustrates another secure air-gapped portable computer system according to an exemplary embodiment of the current invention.

FIG. 3 schematically illustrates another secure air-gapped portable computer system 300 according to an exemplary embodiment of the current invention.

In this exemplary embodiment, the portable computer system 300 PSS/PSD module 82a is similar to PSS/PSD module 82 of FIG. 2 above but is having video processor 97 (FPGA, ASIC or microcontroller) and video memory 99.

Host emulator 72, connected to video processor 97 via channel 87 may serve as system controller for performing mouse tracking function, and control keyboard signaling, for controlling video processor 97 for selecting active windows on display 66, creating, closing, sizing and moving windows on display 66, etc.

US20140289433, to Aviv Soffer; titled "Isolated multi-network computer system and apparatus", which is incorporated herein by reference, provides details on possible embodiments for securely controlling a shared single display, using a video switch or a video combiner, while preventing any possible information leakage between two hosts.

FIG. 4 schematically illustrates screens of the programming software utility screen 800 used for configuring of USB filters 16x within a secure air-gapped portable computer system according to an exemplary embodiment of the current invention.

This screen 800 is presented on the display 66 to enable configuration and monitoring of the USB filters 16x within device 100 or 300. It can be implemented as a program running locally at the corresponding module 2x. Optionally, filter 16b in black module 2b is left open to all devices, or entirely missing. Each filter 16x may have a separate filtering configuration. Additionally and optionally, different USB ports, for example 12a and 13a (and/or 12b and 13b) may be configured differently and may be associated with a separate screen 800. Alternatively, designation may be done using column 209 as detailed below.

Screen 800 is divided into 3 main areas:

Area 220a is the Device White-list area. The entries in lines in this area indicating the devices that are allowed (qualified) by corresponding filter.

Area 220b is the Device Black-list area. The entries in lines in this area indicating the devices that are not allowed (will be rejected) by the by corresponding filter.

Area 220c is the Device Read area. The entries in lines in this area are showing the captured parameters of the currently connected peripheral device.

To access screen 800, the user activates the security application. The user or administrator would need a specific password to interact with the security application. Once password is authenticated and the programmer is authenticated the current device policy will appear in this screen.

Optionally, means to prevent a user from modifying the configurations of filter 16a (and optionally also 16b) are implemented. For example, only privileged "super user", may make such modifications, or an external programming device is needed (e.g. inserted in the USB jack, or into a proprietary programming jack, not seen in these figures), or the lists for 16a are factory installed and non-updatable.

Due to the separation of red and black modules, the administration application is preferably duplicated and run separately for red and black modules.

The user/administrator may enter new lines or drag and drop lines between the three areas—white-list, black-list and device read.

When entering a new line, the user/administrator may specify the following parameters (line number 202 is entered automatically by the system):

1. Column 203 is the USB Class ID. The user/administrator may enter this field to allow/reject specific class of USB peripheral devices. For example: class 03 h is Human interface device (HID)—used by keyboard, mouse, joystick. If a value 03 h is entered in the white—list, it will cause qualification of all USB devices having class 03 h.

2. Column 204 is the USB Sub-Class ID. The user/administrator may enter this field to allow/reject specific sub-class of USB peripheral devices. For example: sub class 02 h, If the value 02 h is entered in the black-list will cause rejection of all USB devices having the designated class indicated in the corresponding Column 203 and sub-class 02 h.

3. Column 205 is the USB Protocol. The user/administrator may enter this field to allow/reject specific protocol of USB peripheral devices. For example: protocol 01. If the value 01 is entered in the white-list will cause qualification of all USB devices having the designated class indicated in the corresponding Column 203 and sub-class indicated in the corresponding Column 204 and using communication protocol 01.

4. Column 206 is the USB Vendor ID (VD). The user/administrator may enter this field to allow/reject specific VID of USB peripheral devices.

5. Column 207 is the USB Product ID (PID). The user/administrator may enter this field to allow/reject specific PID of USB peripheral devices.

6. Column 208 is the USB unique serial number. (SN) The user/administrator may enter this field to allow/reject specific serial numbers or serial number ranges of USB peripheral devices.

7. Column 209 is the Map to Module (2a or 2b) or specific jack (12a, 13a, 12b, 13b). The user/administrator may enter in this field a + or − sign to indicate if that device can be mapped to the specific module or jack.

8. Column 210 is the Direction field. The user/administrator may enter in this field:

a. N for none (no communication of the corresponding module/jack to the specified device, this may be equivalent to inserting "−" in the corresponding location in 209 column, so as not to map the device to the corresponding module/jack);

b. R for read only (corresponding module/jack may only read from the specified device);

c. W for write only (corresponding module/jack may only write to the specified device);

d. RW for both read and write (corresponding module/jack may both read and write to the specified device).

A notation convention is used, for example module (or jack) designation from left to right.

Note that in each textual input field "*" may be entered to indicate wild-card.

Screen 800 may be used for creating, displaying, or modifying the parameters in an authorization matrix associating authorized devices to the modules 2x and to directions of data flow.

Preferably, the parameters of authorization matrix (specifically for red module 2a) may not be accessed via black module 2b as this module may not be trusted to be un-infected with hostile codes or otherwise compromised. Similarly, a device connected to a jack 12x or 13 may not be trusted to be un-infected with hostile codes or otherwise compromised.

Figure 5:
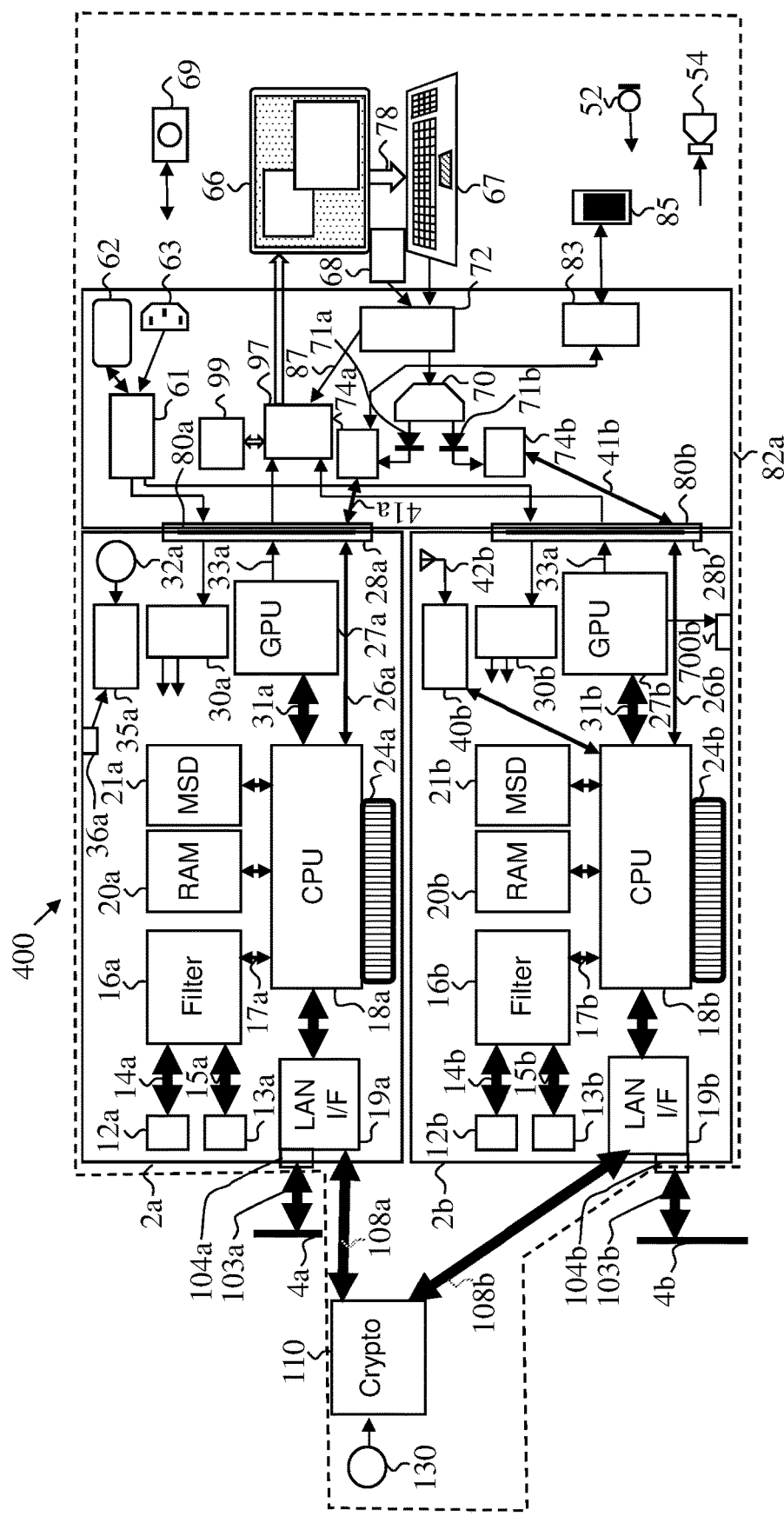
FIG. 5 schematically illustrates an exemplary embodiment of the current invention similar to the embodiment shown in FIG. 3 and further equipped with a Red-Black crypto module according to an exemplary embodiment of the current invention.

FIG. 5 schematically illustrates an exemplary embodiment of the current invention 400 similar to the embodiment 300 shown in FIG. 3 above.

In this embodiment of the current invention 400, the device is further equipped with a Red-Black crypto module 110. Red-Black crypto module 110 allows red messages, voice and video to be sent and received in encrypted format over the black wireless or cellular modem 40b and antenna 42b. Red-Black crypto module 110 may have a battery 130 to support functions such as log, anti-tampering, secret key storage, etc. Red-Black crypto module 110 may be coupled to the Red (Higher-Security) computing module 2a LAN Interface 19a through LAN or RGII or SGMII interface 108a and it may be coupled to the Black (Lower-Security) computing module 2b LAN Interface 19b through LAN or RGII or SGMII interface 108b. Optionally Red-Black crypto module 110 may be coupled to the two computing modules 2x through high-speed USB link or through any other suitable serialized interface. Red-Black crypto module 110 may be for example Raytheon Proteus Cryptographic Module (PCM) or other similar products.

Figure 6:
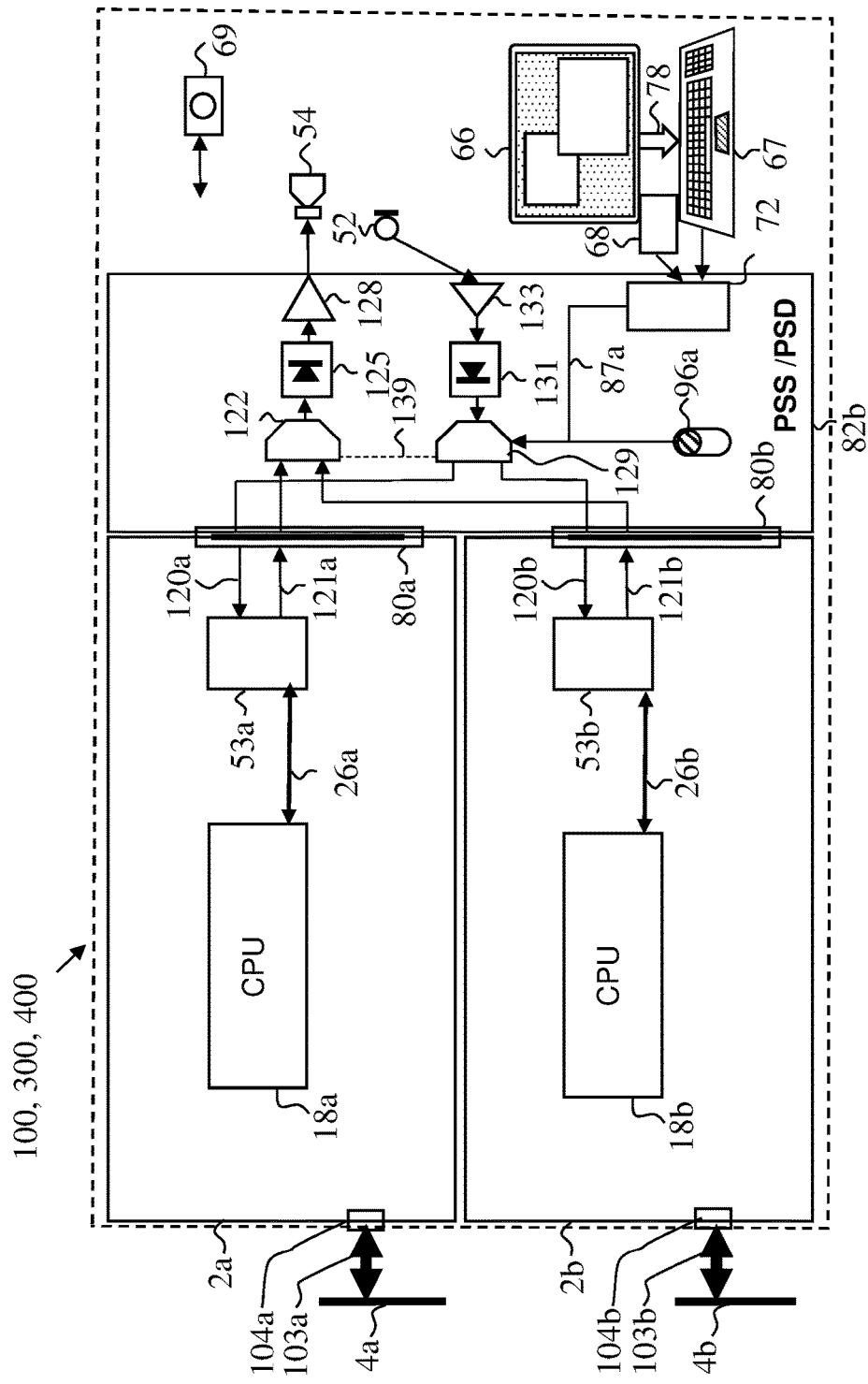
FIG. 6 schematically illustrates the same exemplary embodiment of the current invention shown in FIG. 3 detailing only the audio circuitry.

FIG. 6 schematically illustrates the audio security circuitry of a secure air-gapped portable computer system according to an exemplary embodiment of the current invention.

To reduce cluttering, this optional audio security circuitry was omitted from FIGS. 2, 3 and 5. Some details of PSS/PSD 82c are illustrated in this figure. It should be noted that features and configurations from all PSS/PSD 82x may be combined.

Each module 2x comprises a corresponding audio CODEC 53x which generates a corresponding CODEC audio output 121x and receives a corresponding CODEC audio input 120x. Audio CODEC 53x is coupled to the corresponding CPU 18x, for example via serial bus 26x.

CODEC audio outputs 121a and 121b are joined, or one of them is selected by audio out mux 122. The output of audio out mux 122 is passed through audio out data diode 125, amplified by audio out amplifier 128 and is heard by the user via speaker 54.

Optionally, audio out amplifier 128 is designed to have low output to input signal coupling, and thus may be used as an audio out data diode 125.

Optionally, additionally or alternatively, a back-to-back coding vocoder-decoding vocoder, as disclosed in U.S. Pat. No. 9,697,837 may be added or replace audio out data diode 125.

Audio in signals from microphone 52 are amplified by audio in amplifier 133, optionally passed through audio in diode 131 and fed to audio input mux 129. An audio in mux 129 selects one of CODEC audio inputs 120a or 120b such that one of audio CODEC 53a or 53b receives the signals from microphone 52 at a time.

Optionally, audio in amplifier 133 is designed to have low output to input signal coupling, and thus may be used as an audio in data diode 131.

Optionally, additionally or alternatively, a back-to-back coding vocoder-decoding vocoder, as disclosed in U.S. Pat. No. 9,697,837 may be added or replace audio in data diode 131.

Audio command line 139 controlling audio in mux 129 and audio out mux 122 such that the both audio out and audio in signals are coupled to same module 2x at a time. Preferably, audio command line 139 is controlled by Red-Black switch 96, or audio switch 96a. Optionally, additionally or alternatively, Host Emulator and Controller function 72 controls audio in mux 129 and audio out mux 122 via channel 87a.

It should be noted that control of audio source may be independent of the video control, but due to security it is preferable that both audio input and audio output are coupled to the same module 2x to avoid air-gap bridging by audio signals (for example audio output from speaker 54 may be peaked up by microphone 52).

As used herein, the term "computer", processor or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A secure portable computer device comprising:
    a higher-security computer module, for performing higher-security operations;
    a lower-security computer module, for performing low security operations, the lower-security computer module being air-gapped from the higher-security computer module;
    a secure KVM (Keyboard Video Mouse) switch, interfacing said higher-security computer module and said lower-security computer module to a keyboard, a pointing device and a display, and comprising at least one device emulator, a physical unidirectional enforcing device, and a host emulator for preventing data flow from said higher-security computer module to said lower-security computer module; and
    an enclosure, for enclosing at least said higher-security computer module, said lower-security computer module, and said secure KVM,
    wherein said enclosure is sized to be used as a portable computer to be carried by a user, and
    wherein the higher-security computer module and the lower-security computer module differ from one another in at least one of or any combination of:
        (a) only the lower-security computer module comprises a wireless communication device;
        (b) the higher-security computer module is configured to be locked using a keyed LAN jack in order to prevent crossed connection of the higher-security computer module to a lower-security network;
        (c) only the mass storage device of the higher-security computer module comprises data encryption;
        (d) only the higher-security computer module comprises controlled noise level cooling subsystem to prevent cyberattacks that abuse cooling system noise signature;
        (e) only the higher-security computer module comprises anti-tampering function;
        (f) only the enclosure of the higher-security computer module is made of metal;
        (g) only the higher-security computer module is connected to a user authentication device;
        (h) only the lower-security computer module comprises video output connector to couple the lower-security computer module to an external display or a video projector; and
        (i) only USB connections of the higher-security computer module are filtered to prevent unauthorized USB devices from communicating with the higher-security computer module.

2. The secure portable computer device of claim 1, wherein:
    said higher-security computer module is connected to a higher-security network, and
    said lower-security computer module is connected to a lower-security network.

3. The secure portable computer device of claim 1, wherein said lower-security network is the Internet.

4. The secure portable computer device of claim 1, wherein said secure KVM further preventing data flow from said lower-security computer module to said higher-security computer module.

5. The secure portable computer device of claim 1, wherein said wireless communication device is selected from the group consisting of a cellular modem, Wireless LAN modem, WiFi modem and Bluetooth modem.

6. The secure portable computer device of claim 1, wherein said higher-security computer module further comprises:
   a higher-security filter; and
   at least one higher-security USB jack,
   wherein said higher-security filter is for:
   allowing authorized USB devices to communicate with said higher-security computer module via said higher-security USB jack, and
   preventing unauthorized USB devices from communicating with said higher-security computer module via said higher-security USB jack.

7. The secure portable computer device of claim 6, wherein said higher-security filter qualifies or disqualifies a USB connected to said higher-security USB jack based on a table of higher-security device qualification parameters.

8. The secure portable computer device of claim 7, wherein said lower-security computer module further comprises:
   a lower-security filter; and
   at least one lower-security USB jack,
   wherein said lower-security filter is for:
   allowing authorized USB devices to communicate with said lower-security computer module via said lower-security USB jack, and
   preventing unauthorized USB devices from communicating with said lower-security computer module via said lower-security USB jack,
   wherein said lower-security filter qualifies or disqualifies a USB connected to said lower-security USB jack based on a table of lower-security device qualification parameters,
   and wherein said table of lower-security device qualification parameters is different than said table of higher-security device qualification parameters.

9. The secure portable computer device of claim 1, wherein said secure KVM switch further comprises a video processor providing a composite video signal derived from signals from both said lower-security computer module and said higher-security computer module.

10. The secure portable computer device of claim 9, wherein said secure KVM switch further comprises system controller for performing at least one of:
    mouse tracking; and
    control keyboard signal identification,
    and using the results of said at least one of said mouse tracking and control keyboard signal identification for controlling said video processor for performing at least one of: selecting active window, creating a window, closing a window, sizing a window, and moving windows on a display.

11. The secure portable computer device of claim 1, further comprising a user authentication device.

12. The secure portable computer device of claim 11, wherein said user authentication device is selected from a group consisting of a biometric sensor and smart card reader.

13. The secure portable computer device of claim 1, further comprising:
    a flat screen display, and
    at least one of touch-screen or touch-pad to be used as a pointing device.

14. The secure portable computer device of claim 1, further comprising a power supply charger, wherein isolation in the power supply charger is provided for preventing data leakages through power signaling between said higher-security computer module and said lower-security computer module.

15. The secure portable computer device of claim 1, wherein:
    said higher-security computer module is running a higher-security operating system; and
    said lower-security computer module running a lower-security operating system.

16. The secure portable computer device of claim 1, wherein said enclosure is tamper resistant.

17. The secure portable computer device of claim 1, wherein said enclosure is subdivided to compartments for separately enclosing at least each one of: said higher-security computer module, said lower-security computer module, and said secure KVM switch.

18. The secure portable computer device of claim 17, wherein said compartments for separately enclosing said higher-security computer module, and said secure KVM switch are made of metal.

19. The secure portable computer device of claim 1, wherein said enclosure further comprises at least one tampering sensor,
    wherein, on detection of tampering attempt at least one of the following actions is performed: permanently disabling of at least said higher-security computer module, and permanently erasing data in mass storage associated with said higher-security computer module.

20. The secure portable computer device of claim 1, wherein said tampering sensor is selected from a group consisting of: mechanical tampering switch; accelerometer; light sensor; micro-mesh covering the whole module PCB; and an X-Ray sensor.

21. The secure portable computer device of claim 1, further comprises at least one of:
    audio output such as a speaker or audio output interface; and
    audio signals at least from said higher-security computer module is routed to said audio output via at least one of:
    audio out data diode; or
    a back-to-back coding vocoder-decoding vocoder.

22. The secure portable computer device of claim 1, further comprises a crypto module connected to said higher-security computer module and to said lower-security computer module,
    wherein the crypto module is for allowing data such as files, messages, voice and video to be sent and received in encrypted format over said at least one wireless communication device in said lower-security computer module.

23. The secure portable computer device of claim 22, wherein said crypto module support functions such as log, anti-tampering, and secret key storage.

24. The secure portable computer device of claim 1, wherein the secure portable computer device is configured to couple a filtered and authorized external USB device to the host emulator to augment or replace the internal keyboard and pointing device of the secure portable computer device.

* * * * *